Dec. 22, 1970  F. A. ELLIS  3,548,659

DEVICES FOR MEASURING THE LIQUID CONTENTS OF CONTAINERS

Filed May 22, 1968

INVENTOR
FREDERICK ALBERT ELLIS

BY
ATTORNEY

United States Patent Office 3,548,659
Patented Dec. 22, 1970

3,548,659
DEVICES FOR MEASURING THE LIQUID CONTENTS OF CONTAINERS
Frederick Albert Ellis, Dorset, England, assignor to Flight Refuelling Limited, London, England
Filed May 22, 1968, Ser. No. 731,022
Claims priority, application Great Britain, May 24, 1967, 24,137/67
Int. Cl. G01f 23/10
U.S. Cl. 73—314                                 4 Claims

ABSTRACT OF THE DISCLOSURE

A device for measuring the quantity of liquid in a receptacle comprises a calibrated measuring rod insertable in a substantially vertical tube in the receptacle and carrying an electrically operated indicator. A float surrounding the tube and supported by the liquid carries a magnet which actuates a switch on the measuring rod to close the circuit of the indicator when the switch arrives at the same level as the magnet, and the position of the rod can then be read off by using the calibration marks thereon.

---

This invention relates to devices for measuring the liquid contents of containers such as fuel tanks, and has for its object to provide a simple and reliable device for that purpose.

Numerous devices for this purpose have been proposed in which a tubular guide, sealed to prevent leakage of liquid into its interior and extending substantially vertically in the container, has slidably mounted on its external surface a float carrying a magnet. Since the float is supported on the surface of liquid in the container, its position is an indication of the quantity of liquid in the container. Various methods have been proposed for obtaining a reading of the position, such as, for example, the mounting of switches inside the guide which are influenced by the magnet and lamps or other indicators each one of which is illuminated when the float magnet is level with its associated switch. Other proposed methods involve the use of a rod or flexible band mounted in or insertable in the guide and carrying a magnetic armature or a second magnet co-operating with the float magnet to provide a magnetic coupling acting to hold the rod or band in a position at which the armature or second magnet is level with the float magnet, the rod or band being calibrated to indicate the liquid level or being coupled mechanically to a rotary or other indicator.

According to the present invention, in a device for measuring the liquid contents of a receptacle including a float slidable on the exterior of a tubular guide extending substantially vertically in the container, and a magnet carried by the float, a calibrated measuring rod insertable in the tubular guide carries an electrically actuated indicator and a magnetically operated switch operable to cause the closing of an electric circuit including said indicator and a source of electric current, the switch being so arranged that it is actuated by the influence of the float magnet when, by insertion of the measuring rod in the tubular guide, the said switch is brought to the same level as the float, thereby actuating the indicator to show that this position has been reached.

Preferably, the magnetically operated switch is a reed switch, and the said switch, when closed, may be arranged to activate a transistor to supply current to the indicator.

The invention is hereinafter described with reference to the accompanying drawings, in which.

Figure 1:
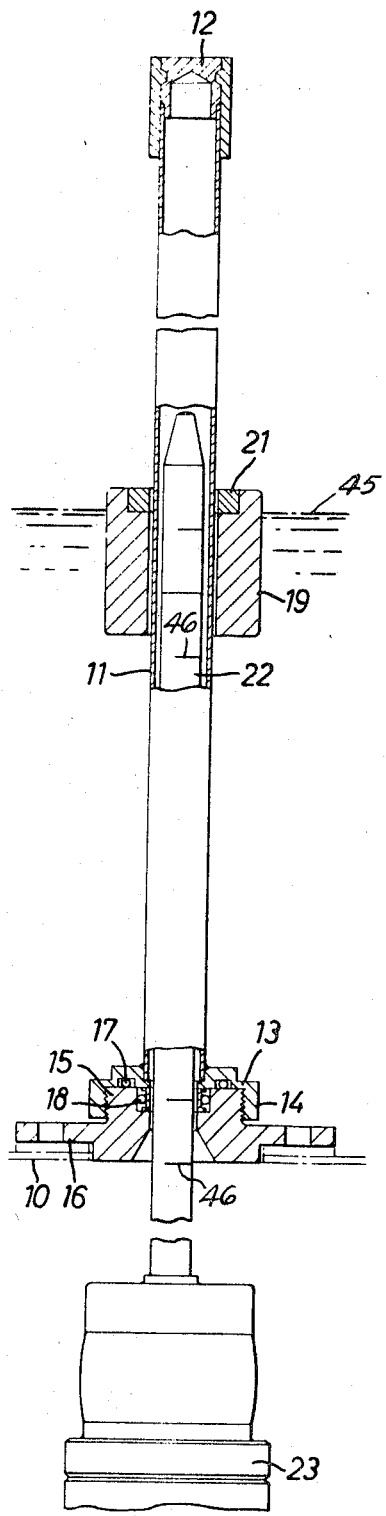
FIG. 1 is an elevation, partly in section of one embodiment of the invention, the measuring rod being inserted in the tubular float guide.

Referring to FIG. 1 of the drawings, a liquid container, part of the bottom wall of which is shown at 10, has mounted therein, in a substantially vertical attitude, a tube 11 of non-magnetic material, closed at its upper end in a fluid-tight manner by a plug 12. At its lower end the tube 11 has secured to it, for example by welding, a flange 13 formed with an internally screw-threaded cylindrical rim 14 to engage a screw-threaded boss 15 on an annular plate 16 fixed to the container wall 10 so as to surround a hole therein. Sealing means 17 and 18 ensure a fluid-tight joint between the tube 11 and the wall 10. The tube 11 constitutes a tubular guide for a float 19 which is slidably mounted on the tube 11 and carries a ring-shaped permanent magnet 21 surrounding the said tube.

A hollow rod 22 adapted to be inserted into the tube 11 through the open lower end thereof as shown in FIG. 1 has a magnetically-controlled switch mounted at one end thereof and is attached at its other end to a tubular handle 23.

Figure 2:
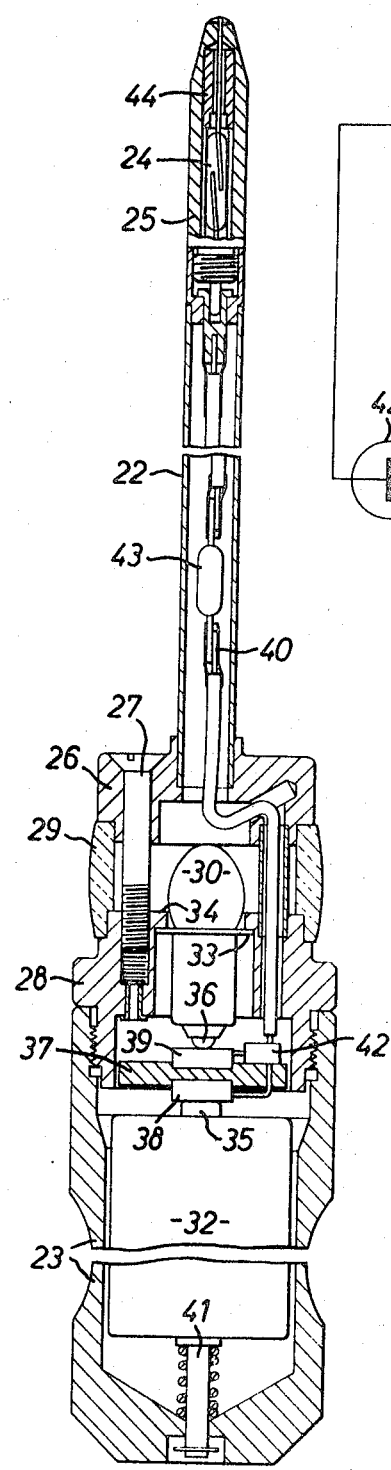
FIG. 2 is a sectional elevation, on an enlarged scale of the measuring rod.

Referring to FIG. 2, the magnetically controlled switch is a reed switch 24 mounted in a housing 25 at the tip of the rod 22. The other end of the rod is fixed into a metal cap 26 secured by screws 27 extending parallel to the axis of the rod to a metal bulb-holder 28, a ring of transparent or translucent material 29 being clamped between the cap 26 and the bulb-holder 28 to provide a window through which light produced by an electric light bulb 30 in the bulb-holder can be seen. The tubular handle 23 is formed of metal and has screw-threaded engagement with the bulb-holder. The said handle provides a housing for an electric battery 32.

The bulb 30 has a flange 33 supported against a shoulder 34 in the bulb-holder 28 and, between a contact 35 at one end of the battery 32 and a centre contact 36 on the bulb there is mounted a disc 37 of insulating material having central contacts 38 and 39 one on each side thereof, the contact 38 engaging the battery contact 35 and the contact 39 engaging the bulb contact 36. A spring-loaded contact 41 in the handle 23 engages a contact at the other end of the battery 32, and urges the contacts 38, 35 and 39, 36 into engagement one with the other.

The disc 37 also carries a transistor 42 of the PNP type the emitter and collector of which are respectively connected to the contacts 38 and 39, whilst the base is connected by a conductor 40 extending along the hollow rod 22 to one side of the switch 24, the other side of which is earthed to the rod. A resistor 43 is inserted in the conductor 40. The rod 22, handle 23, bulb-holder 28 and cap 26 are all in electrical contact with each other, and so provide an earth for the electric circuit.

The ring shaped magnet 21 may be found to provide a magnetic field of a strength insufficient to close the reed switch 25 if the rod 22 is moved rapidly into the tube 11. To avoid this disadvantage, a second permanent magnet 44, FIG. 2, may be mounted in the housing 25 close to the reed switch, the magnet 44 producing a magnetic field which exerts a closing force on the reed switch but is insufficiently strong to close the said switch, the said magnet being, however, capable of holding the switch closed once it has been closed. The arrangement is such that, as the reed switch passes the magnet 21 during insertion of the rod the combined magnetic fields close the switch, which remains closed if inward movement is continued but is opened when the reed switch again passes the ring-shaped magnet 21 with the rod moving in the outward direction. To achieve this result, the ring-shaped magnet is conveniently magnetised radially, so that its poles are at its internal and external peripheries, whereas the magnet 44 is tubular and co-axial with the rod 22 and has its poles one at each end, the end of the said magnet 44 which first passes nearest the ring-shaped magnet 21 as the rod 22 is inserted in the tube 11 having polarity opposite to that of the inner periphery of the ring-shaped magnet 21.

Figure 3:
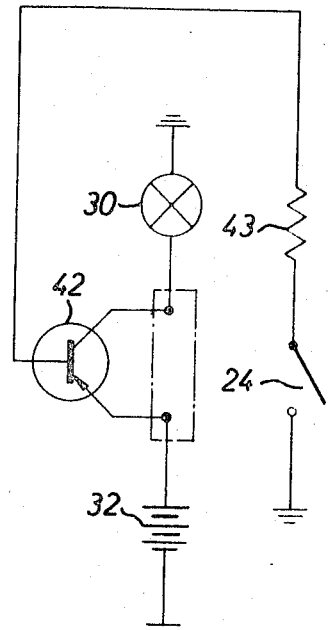
FIG. 3 is an electrical circuit diagram.

FIG. 3 is a diagram of the electrical circuit, the components being indicated by the same references as in FIG. 2.

The float 19 will, of course, rise and fall with the liquid in the container. Assuming that the liquid level is as indicated at 45 in FIG. 1, and the hollow rod 22 is inserted upwardly into the tube 11, the reed switch 24, which is normally biassed to the open position will, when the tip of the rod 22 reaches the position shown, come under the influence of the magnet 21, and will be closed. The transistor will thus be activated to pass current to the bulb 30, which will be illuminated. The rod 22 is provided with scale markings 46 so that its position when the bulb is illuminated can be determined by noting the marking at the point where the rod emerges from the lower end of the tube, and from this position the volume of liquid in the container can be determined.

The rod may be calibrated to read directly the volume of liquid in a container of a particular size and shape, or may be calibrated in units of length from which the contents of the container can be calculated, assuming that the cross-sectional area of the container is known, or can be obtained from tables.

It will be understood that other magnetically-operated switching arrangements may be used instead of that specifically described, and that an audible indicating device may be used instead of a lamp. The open end of the tube 11 may, if preferred, be at its upper end instead of its lower end, depending on the direction from which the rod can be more conveniently inserted.

I claim:

1. A device for measuring the liquid contents of a receptacle including a float slidable on the exterior of a tubular guide extending substantially vertically in the container, and radially magnetised annular magnet means carried by the float substantially coaxially with the tubular guide, wherein a calibrated measuring rod insertable in the tubular guide carries an electrically actuated indicator, a magnetically operated switch operable to cause the closing of an electric circuit including said indicator and a source of electric current, and a second permanent magnet creating a field which exerts a closing force on the switch of sufficient strength to hold said switch closed but not to move it to the closed position, said field being reinforced by the field of the annular magnet means to cause closing of the switch when the switch is brought to the level of the annular magnet means by insertion of the measuring rod into the tubular guide thereby actuating the indicator to show that this position has been reached, and being opposed by the field of the annular magnet means when the switch passes the annular magnet means during withdrawal of the rod from the tubular guide, to allow the switch to open.

2. A device according to claim 1 wherein the measuring rod is mounted on a handle forming a housing for an electric battery and an electric bulb, the said handle being provided with a window through which light from the bulb is visible, closure of the switch causing current from the battery to be supplied to the bulb.

3. A device for measuring the liquid contents of a receptacle including a float slidable on the exterior of a tubular guide extending substantially vertically in the container, an annular plate mounted at the bottom of the container and supporting the tubular guide, and a magnet carried by the float, wherein a calibrated measuring rod insertable in the tubular guide is mounted on a handle forming a housing for an electric battery and an electric bulb, the said handle being provided with a window through which light from the bulb is visible, and a magnetically operated reed switch operable to cause the closing of an electric circuit including the electric battery and the electric bulb, the switch being so arranged that it is actuated by the influence of the float magnet to activate a transistor to supply current from the battery to the bulb when, by insertion of the measuring rod in the tubular guide, said switch is brought to the same level as the float, thereby actuating the bulb to show that this position has been reached, and wherein the measuring rod carries a second permanent magnet close to the reed switch, the second permanent magnet creating a field which exerts a closing force on the switch of sufficient strength to hold the said switch closed but not to move it to the closed position, the said field being reinforced by the field of the float magnet when the switch passes the float magnet during insertion of the measuring rod in the tubular guide, to cause closing of the switch and being opposed by the field of the float magnet when the switch passes the float magnet during withdrawal of the rod from the tubular guide, to allow the switch to open.

4. A device according to claim 3, wherein the float magnet is a radially magnetised ring-shaped magnet and the second magnet is a tubular magnet coaxial with the rod and magnetised longitudinally so that its poles are one at each end, the polarity of the two magnets being such that, as the rod is inserted in the tube the end of the tubular magnet which first passes the ring-shaped magnet is of opposite polarity to the inner periphery of the ring-shaped magnet.

References Cited
UNITED STATES PATENTS

| | | | |
|---|---|---|---|
| 2,354,945 | 8/1944 | Cohen et al. | 33—126.75X |
| 2,598,835 | 6/1952 | Ryan | 73—314 |
| 2,771,774 | 11/1956 | Jormasieri | 73—313 |
| 3,049,011 | 8/1962 | Campbell | 73—298X |
| 3,155,792 | 11/1964 | Werts | 73—290(A) |
| 3,258,968 | 7/1966 | Woodcock | 73—308 |
| 3,343,152 | 9/1967 | Hart | 340—244(C) |
| 3,389,603 | 6/1968 | Jacobs | 73—290(A)X |
| 2,968,172 | 1/1961 | Johnson | 340—244(C) |
| 3,304,381 | 2/1967 | McAnespey | 200—61.89 |

LOUIS R. PRINCE, Primary Examiner

D. M. YASICH, Assistant Examiner

U.S. Cl. X.R.

200—84; 340—244